(12) United States Patent
Kim

(10) Patent No.: US 7,384,356 B2
(45) Date of Patent: Jun. 10, 2008

(54) PULLEY COVER ASSEMBLY FOR MOTORCYCLE TRANSMISSION

(76) Inventor: Heon K. Kim, 802dong-102, Mokdong Apt. 8-Danji, Sinjeong 6-dong 314, Yangcheon-gu, Seoul (KR)

( * ) Notice: Subject to any disclaimer, the term of this patent is extended or adjusted under 35 U.S.C. 154(b) by 0 days.

(21) Appl. No.: 11/059,519

(22) Filed: Feb. 17, 2005

(65) Prior Publication Data

US 2005/0282670 A1     Dec. 22, 2005

(30) Foreign Application Priority Data

Jun. 18, 2004    (KR) .................. 10-2004-0045609

(51) Int. Cl.
*B62J 13/00*       (2006.01)
*F16H 57/02*     (2006.01)
(52) U.S. Cl. ............... 474/144; 192/85 CA; 192/96
(58) Field of Classification Search ............ 474/144, 474/70, 174, 165, 182, 199; 74/646; 192/96, 192/85 CA, 91 A
See application file for complete search history.

(56) References Cited

U.S. PATENT DOCUMENTS

| | | | |
|---|---|---|---|
| 4,287,977 A * | 9/1981 | Haga et al. ............. | 192/91 A |
| 4,565,269 A * | 1/1986 | Kawasaki et al. ....... | 192/70.12 |
| 4,793,457 A * | 12/1988 | Siewert et al. ........... | 192/112 |
| 6,419,067 B1 * | 7/2002 | Fischer ................... | 192/85 CA |
| 6,544,134 B2 * | 4/2003 | Ohyama et al. ......... | 474/144 |

OTHER PUBLICATIONS

Inobe Yoshiyuki, Publication No. 59-197625 dated Nov. 9, 1984, Patents Abstracts of Japan.

* cited by examiner

*Primary Examiner*—Richard Ridley
*Assistant Examiner*—Terence Boes
(74) *Attorney, Agent, or Firm*—Venable LLP; Catherine M. Voorhees

(57) ABSTRACT

Disclosed herein is a pulley cover assembly for a motorcycle transmission which can securely support a pulley to minimize an shivering phenomenon thereof caused when a load is applied to the rotating pulley, thereby attenuating noise due to the shivering phenomenon and improving a rotational performance of the pulley. Further, the pulley cover assembly can ensure convenient clutch operation through the use of a hydraulic clutch operating mechanism. The clutch operating mechanism includes a hydraulic casing integrally formed at the pulley cover and having a hydraulic oil inlet passage and a hydraulic oil outlet passage, and a piston disposed inside the hydraulic casing while being fixed to an end of the clutch rod of the motorcycle transmission. Such a clutch operating mechanism is adapted to supply hydraulic power into the hydraulic casing to permit the piston to linearly move the clutch rod by a predetermined distance. The pulley cover assembly comprises a pulley supporting means positioned at one side of the pulley opposite to a transmission cover to permit the pulley to be securely supported at both ends thereof by both the pulley supporting means and the transmission cover.

2 Claims, 5 Drawing Sheets

PRIOR ART

PULLEY COVER ASSEMBLY FOR MOTORCYCLE TRANSMISSION

CROSS-REFERENCE TO RELATED APPLICATION

Priority is claimed herein with respect to Korean Patent Application No. 10-2004-0045609 filed in the Korean Patent Office on Jun. 18, 2004, the disclosure of which is incorporated herein by reference.

BACKGROUND OF THE INVENTION

1. Field of the Invention

The present invention relates to a pulley cover assembly for a motorcycle transmission, and more particularly, to a pulley cover assembly for a motorcycle transmission which can permit not only secure support of a pulley rotatably mounted on an intermediate shaft of the motorcycle transmission to thereby ensure smooth rotating motion of the pulley with an improved rotational performance, but also hydraulic operation of a clutch operating mechanism to thereby ensure convenient clutch operation.

2. Description of the Related Art

In general, motorcycles perform transmission of rotatory power produced from a motorcycle engine via a motorcycle transmission. Then, the rotatory power is delivered to a driving pulley 1, which is connected to a driven pulley 2, mounted on a motorcycle's rear wheel, via a belt 3 as shown in FIG. 1, to thereby permit rotation of the rear wheel. The driving pulley 1 is located at one side of the motorcycle transmission so as to freely rotate on an intermediate shaft 4 of the motorcycle transmission. Such a driving pulley 1 is conventionally interposed between the motorcycle's front and rear wheels.

A pulley cover assembly 5 is fixedly mounted at one side of the motorcycle transmission, and as shown in FIG. 1, serves to cover and protect the driving pulley 1 while improving the appearance thereof. The pulley cover assembly 5 includes a clutch operating mechanism to permit engagement or disengagement of a clutch disc included in the motorcycle transmission.

Referring to FIG. 2 illustrating the interior configuration of the conventional pulley cover assembly 5, the pulley cover assembly 5 consists of a pulley cover 5a to cover and protect the driving pulley 1, and the clutch operating mechanism mounted at one side of the pulley cover 5a.

The driving pulley 1 is engaged at a rotational center portion thereof with teeth of an output gear 6 of the motorcycle transmission so as to rotate simultaneously with the output gear 6. A separation-preventing plate 15 is coupled to both the engaged driving pulley 1 and the output gear 6 to prevent unintentional separation of the driving pulley 1 from the output gear 6. The output gear 6 is supported on the outer circumference of the intermediate shaft 4 via bearings 7 in a rotatable manner. Consequently, the driving pulley 1 is supported on the intermediate shaft 4 so as to freely rotate about the intermediate shaft 4.

The pulley cover 5a defines an interior space suitable to accommodate the driving pulley 1 and is opened at one side thereof to permit access to the driving pulley 1. The pulley cover 5a, covering the driving pulley 1, is fastened to a transmission cover 8 by means of fasteners.

The clutch operating mechanism includes a case 9 attached to the outer side of the pulley cover 5a, and a fixed plate 10 and a moving plate 11 disposed inside the case 9. The fixed plate 10 is affixed to an inner surface of the case 9 by fixing means, while the moving plate 11, positioned to face the fixed plate 10, is supported by the case 9 so as to freely rotate about the same axis as the intermediate shaft 4.

To the moving plate 11 is fastened one end of a clutch rod 12. The other end of the clutch rod 12 is inserted through an axial through-bore centrally formed in the intermediate shaft 4 by passing through the pulley cover 5 and comes into contact with a connection rod 13, which is connected to a clutch disc (not shown) of the motorcycle transmission.

Meanwhile, a ball 14 is interposed between the fixed plate 10 and the moving plate 11. The ball 14 is seated in an inclined circumferential groove lib defined at a surface of the moving plate 11. A distal end 11a of the moving plate 11 opposite to the inclined circumferential groove 11b is connected to a clutch lever (not shown), provided at a motorcycle handle, via a wire (not shown).

With such a configuration, when a motorcyclist pulls the clutch lever, the wire, connected between the clutch lever and the moving plate 11, is pulled to rotate the moving plate 11. The rotation of the moving plate 11 causes the ball 14 to move toward a shallow side of the inclined circumferential groove 11b to permit the moving plate 11 to move far away from the fixed plate 10 toward a position as is shown in FIG. 2. Thereby, by movement of the rotating moving plate 11, the clutch rod 12 and the connection rod 13 cooperate to drive the clutch disc (not shown) of the motorcycle transmission to implement clutch operation. Conversely, if the motorcyclist releases the clutch lever, the connection rod 13, the clutch rod 12 and the moving plate 11 are successively returned to their original positions upon operation of an elastic restoration means provided at the clutch disc.

However, with the conventional pulley cover assembly 5 configured as stated above, since one side of the driving pulley 1 is in an unsupported unstable state although the other side of the driving pulley 1, which is rotatably mounted on a distal end of the intermediate shaft 4 protruding from the motorcycle transmission, is supported by the transmission cover 8, there is a problem of an shivering phenomenon on the distal end of the intermediate shaft 4 and on the pulley 1 when a driving load of the motorcycle is applied to the pulley 1. Such an shivering phenomenon induces undue noise, deteriorates rotational performance of the pulley 1, and results in wear or degradation of elements associated with a specific portion of the pulley 1 rotatably supported on the intermediate shaft 4, reducing the life span of the pulley 1.

Further, the clutch operating mechanism of the conventional pulley cover assembly 5 is inconvenient in use because it must be only manually driven through linear movement of the moving plate 11 caused by a pulling force of the wire.

SUMMARY OF THE INVENTION

Therefore, the present invention has been made in view of the above problems, and it is an object of the present invention to provide a pulley cover assembly for a motorcycle transmission which can permit secure support of a pulley and minimize an shivering phenomenon possibly caused by load applied to the pulley upon rotation, thereby attenuating noise due to the shivering phenomenon and improving a rotational performance of the pulley.

It is another object of the present invention to provide a pulley cover assembly for a motorcycle transmission which can permit hydraulic operation of a clutch operating mechanism, thereby ensuring easy and convenient clutch operation.

In accordance with an aspect, the present invention provides a pulley cover assembly for a motorcycle transmission comprising a pulley cover to cover and protect a pulley rotatably supported on a distal end of an intermediate shaft protruding through a transmission cover, and a clutch operating mechanism provided at one side of the pulley cover to operate a clutch rod of the motorcycle transmission, the pulley cover assembly further comprising a pulley supporting means positioned at an one side of the pulley opposite to the transmission cover to permit the pulley to be supported at both sides thereof by both the pulley supporting means and the transmission cover.

Preferably, the clutch operating mechanism may include a hydraulic casing integrally formed at the pulley cover and having a hydraulic oil inlet passage and a hydraulic oil outlet passage, and a piston disposed inside the hydraulic casing while being fixed to an end of the clutch rod of the motorcycle transmission, whereby the clutch operating mechanism supplies hydraulic power into the hydraulic casing to permit the piston to linearly move the clutch rod by a predetermined distance.

Preferably, the pulley supporting means may include a rotatable supporting bracket installed between the pulley and the pulley cover and affixed to a surface of the pulley, and a bearing installed between the rotatable supporting bracket and the pulley cover.

Preferably, the pulley supporting means may include an extended intermediate shaft portion integrally extending from the intermediate shaft of the motorcycle transmission toward the pulley cover to support the pulley thereon in a rotatable manner, and a bearing installed between the pulley cover and the extended intermediate shaft portion.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred and alternative embodiments of the present invention will be described in detail with reference to the annexed drawings.

Figure 3:
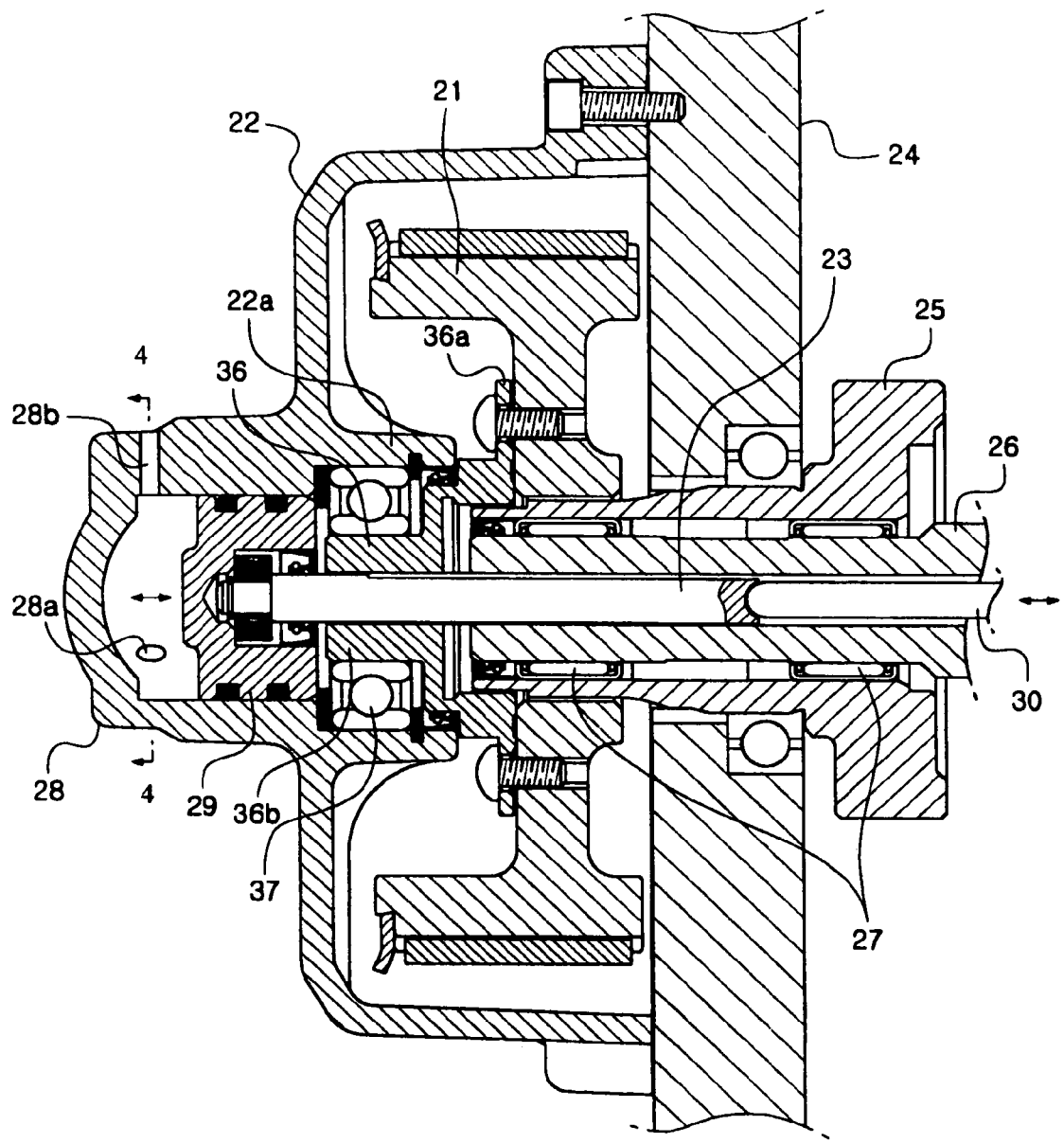
FIG. 3 is a sectional view of a pulley cover assembly for a motorcycle transmission in accordance with a first embodiment of the present invention.

FIG. 3 is a sectional view of a pulley cover assembly for a motorcycle transmission in accordance with a first embodiment of the present invention. As shown in FIG. 3, the pulley cover assembly of the present invention comprises a pulley cover 22 to cover and protect a pulley 21, a clutch operating mechanism mounted at one side of the pulley cover 22 and adapted to operate a clutch rod 23 of the motorcycle transmission, and a pulley supporting means to support one side of the pulley 21, which is supported at the other side thereof by a transmission cover 24.

Figure 1:
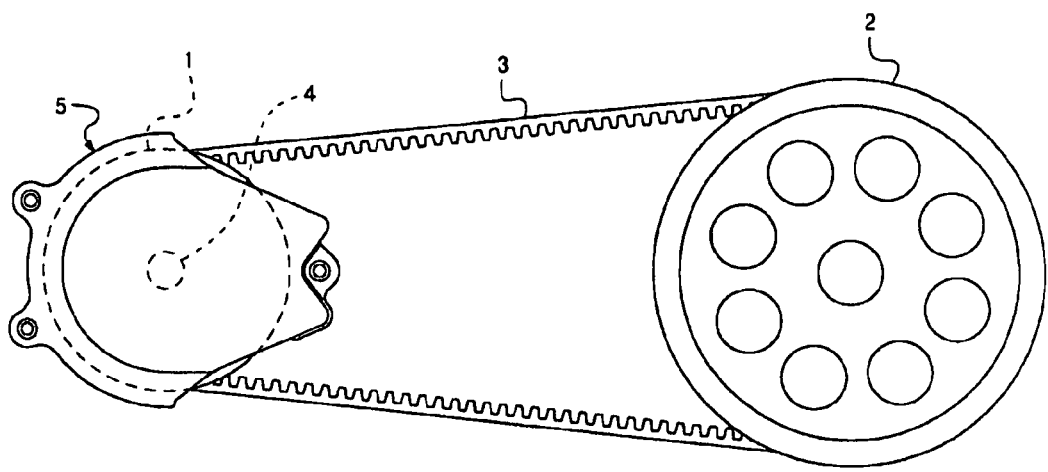
FIG. 1 is a front view illustrating an installed state of a conventional pulley cover assembly for a motorcycle transmission.
Figure 2:
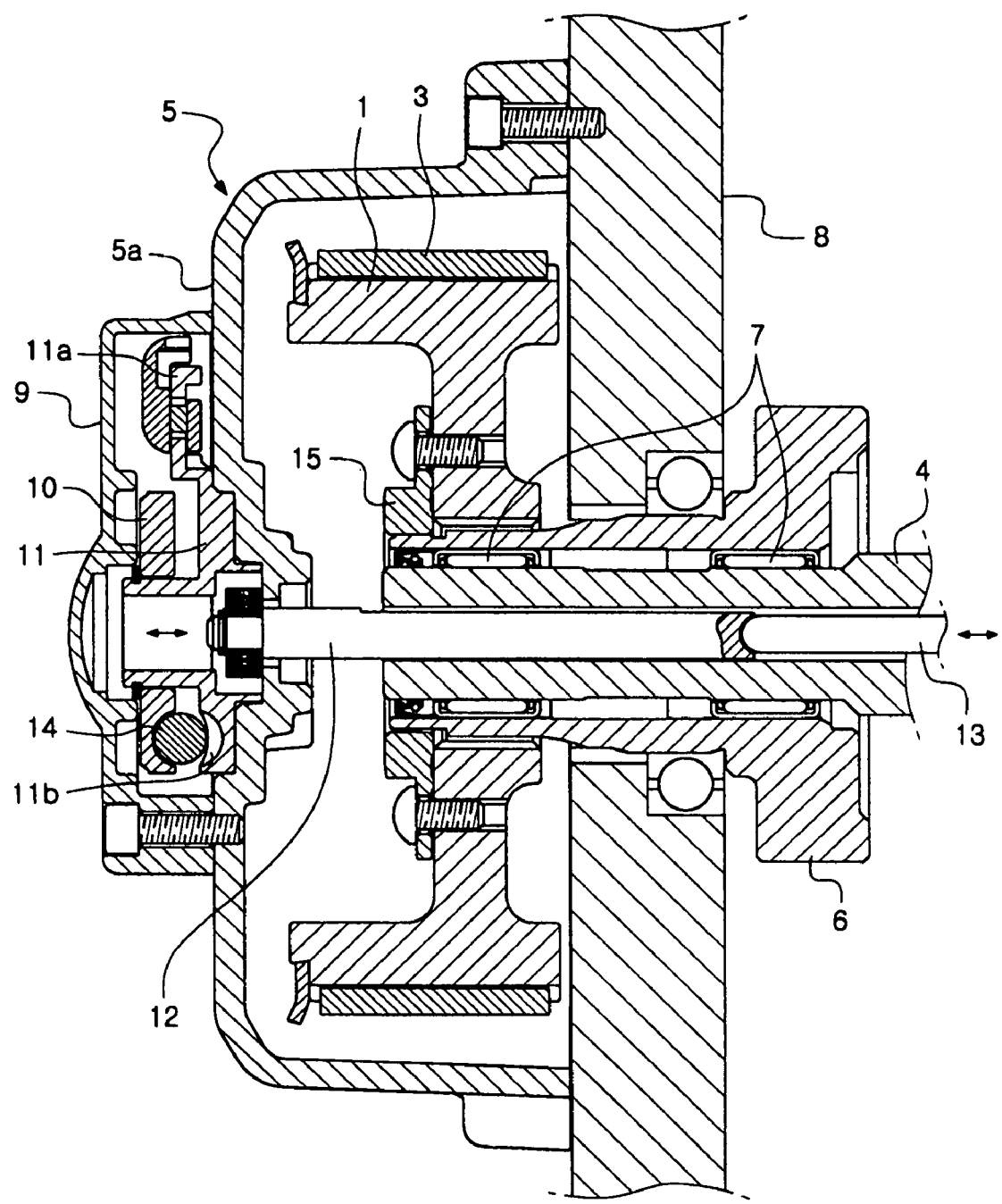
FIG. 2 is a sectional view of the conventional pulley cover assembly shown in FIG. 1.

The pulley 21 serves to receive rotatory power from the motorcycle transmission and deliver the rotatory power to a driven pulley, mounted on a motorcycle's rear wheel, via a belt (see FIG. 1). The pulley 21 is engaged at a rotational center portion thereof with teeth of an output gear 25 of the motorcycle transmission penetrating through the transmission cover 24 so as to rotate simultaneously with the output gear 25. The output gear 25 is rotatably supported on the outer circumference of an intermediate shaft 26 via bearings 27. Consequently, the pulley 21 is supported on the intermediate shaft 26 so as to freely rotate about the intermediate shaft 26.

The pulley cover 22 defines an interior space suitable to accommodate the pulley 21 and is opened at one side thereof to permit access to the pulley 21. The pulley cover 22, covering the pulley 21, is fastened to the transmission cover 24 by means of fasteners. Such an arrangement is effective to protect a specific portion of the pulley 21, assembled to an associated portion of the motorcycle transmission, from the outside while improving the appearance thereof.

The clutch operating mechanism includes a hydraulic casing 28 integrally formed at the pulley cover 22 and having a hydraulic oil inlet passage 28a and a hydraulic oil outlet passage 28b, and a piston 29 disposed inside the casing 28 while being fixed to an end of the clutch rod 23 of the motorcycle transmission.

The other end of the clutch rod 23, in the same manner as the prior art, is inserted through an axial through-bore centrally formed in the intermediate shaft 26 by passing through the pulley cover 22 and comes into contact with a connection rod 30, which is connected to a clutch disc (not shown) of the motorcycle transmission.

Figure 4:
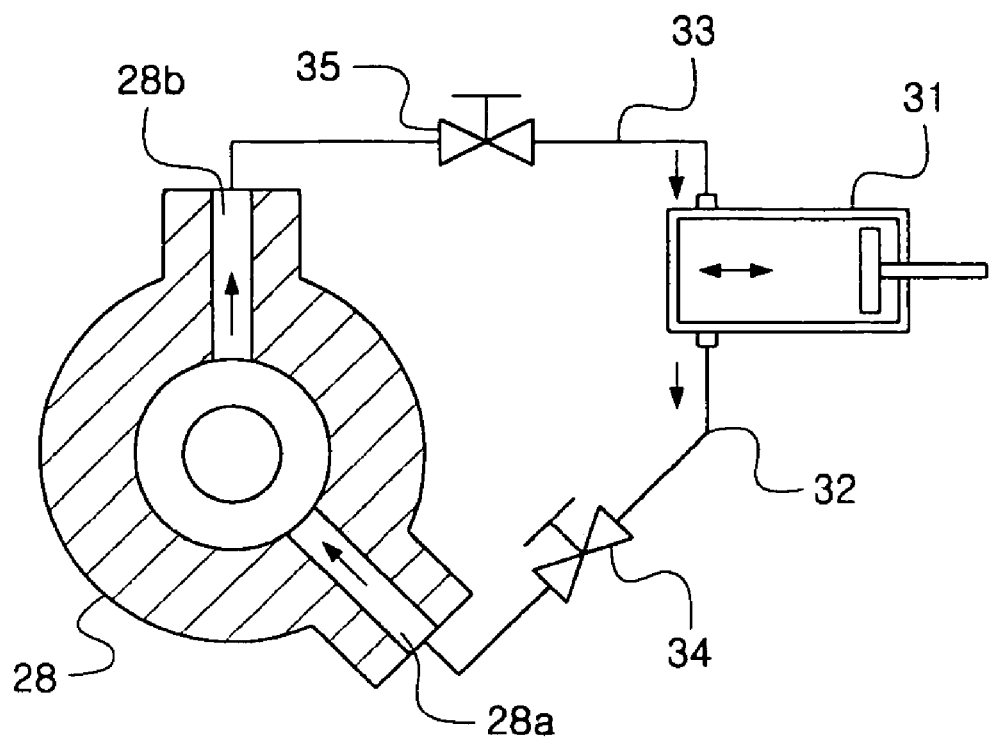
FIG. 4 is a sectional view taken along line A-A shown in FIG. 3.

Meanwhile, in the present embodiment, a conventional hydraulic power supply device is provided to supply hydraulic power into the hydraulic casing 28. Referring to FIG. 4 shown as a sectional view taken along line A-A shown in FIG. 3, the hydraulic power supply device is comprised of a master cylinder 31 to produce hydraulic power through manual operation of a clutch lever (not shown), an feed pipe 32 to deliver the produced hydraulic power from the master cylinder 31 to the hydraulic oil inlet passage 28a of the hydraulic casing 28, and a return pipe 33 to return the hydraulic power outlet from the hydraulic oil outlet passage 28b of the hydraulic casing 28 into the master cylinder 31. Both the feed pipe 32 and the return pipe 33 are installed with check valves 34 and 35, respectively, to permit supply of the hydraulic power in only a direction marked by arrows.

With such a configuration, when a motorcyclist pulls the clutch lever, the hydraulic power, produced by the master cylinder 31, is delivered into the hydraulic casing 28 so as to move the piston 29 to a position as is shown in FIG. 3. Thereby, through cooperation of the clutch rod 23 and the connection rod 30, the clutch disc (not shown) of the motorcycle transmission can be operated. Conversely, when the motorcyclist releases the clutch lever, the connection rod 30, the clutch rod 23 and the piston 29 are returned to their original positions upon operation of an elastic restoration means provided at the clutch disc. As a result, the hydraulic power is returned from the hydraulic casing 28 into the master cylinder 31 via the hydraulic oil outlet passage 28b.

The pulley supporting means includes a rotatable supporting bracket 36 installed between the pulley 21 and the pulley cover 22, and a bearing 37 installed between the rotatable supporting bracket 36 and the pulley cover 22. The rotatable supporting bracket 36 has a fixed portion 36a and a rotatable supporting portion 36b. The fixed portion 36a is fastened to the pulley 21 by means of fastening means, such as bolts, so as to prevent separation of the pulley 21.

The pulley cover 22 has a hollow cylindrical supporting portion 22a protruding toward the pulley 21, and the bearing 37 of the pulley supporting means is inserted between the rotatable supporting portion 36b of the rotatable supporting bracket 36 and the cylindrical supporting portion 22a of the pulley cover 22 so as to support the supporting bracket 36 in a rotatable manner.

With the pulley cover assembly for the motorcycle transmission in accordance with the first embodiment of the present invention, one side of the pulley 21 is supported by the transmission cover 24, and the other side of the pulley 21 is supported by the supporting portion 22a of the pulley cover 22 via both the rotatable supporting bracket 36 and the bearing 37. This permits the pulley 21 to be securely supported at both sides thereof.

Thereby, even if any load is applied to the pulley 21 during motorcycle driving, an shivering phenomenon on the pulley 21 can be minimized to thereby permit an attenuated noise and an enhanced rotational performance of the pulley 21, and eliminates the risk of wear or degradation of elements associated with a specific portion of the pulley 21 rotatably supported on the intermediate shaft 26 of the motorcycle transmission.

Further, the clutch operating mechanism of the pulley cover assembly according to the present invention permits hydraulic clutch operation by virtue of the hydraulic casing 28 formed with the hydraulic oil inlet and outlet passages 28a and 28b as well as the piston 29 disposed inside the hydraulic casing 28. The hydraulic operation can allow easy and convenient clutch operation.

Figure 5:
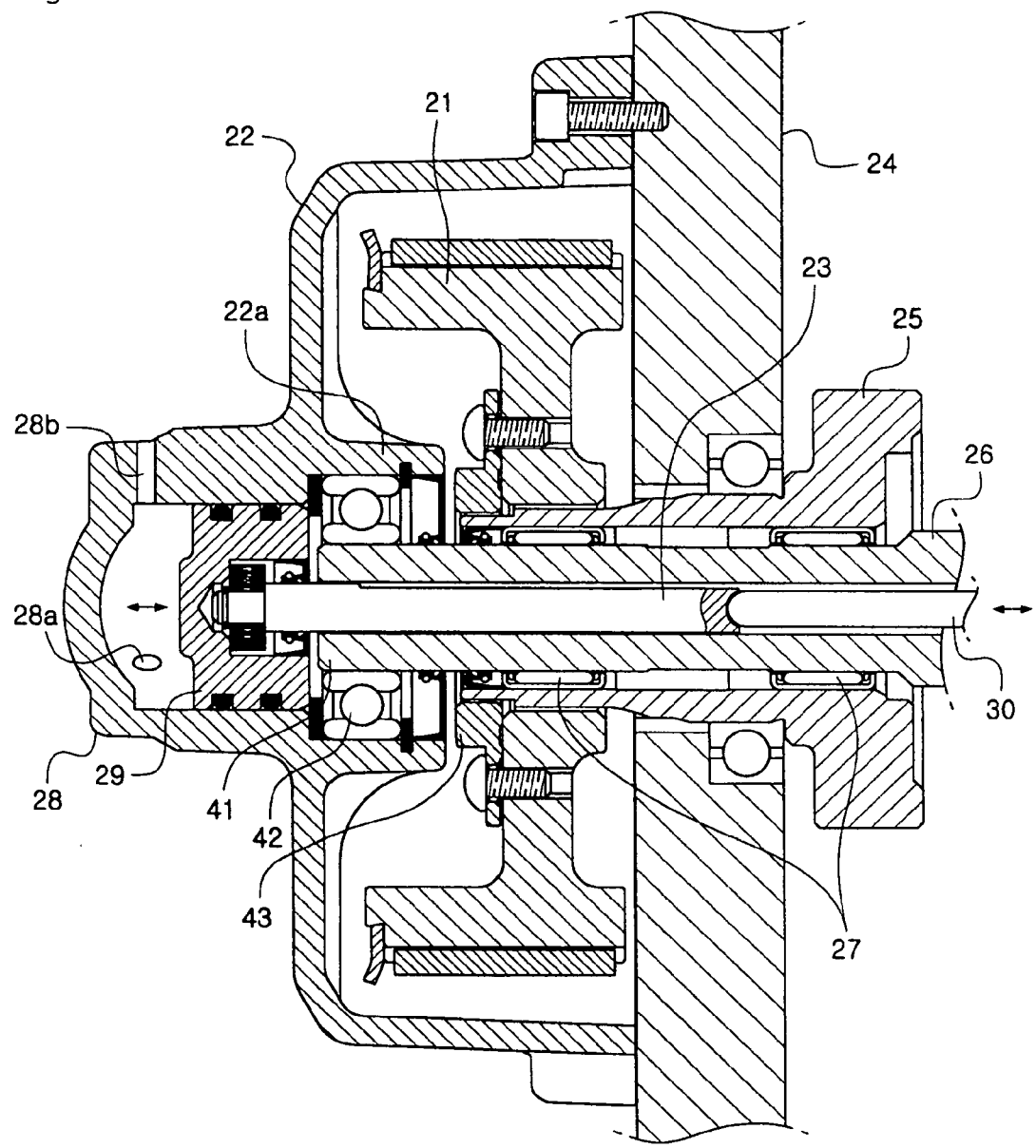
FIG. 5 is a sectional view of a pulley cover assembly for a motorcycle transmission in accordance with a second embodiment of the present invention.

FIG. 5 is a sectional view of a pulley cover assembly for the motorcycle transmission in accordance with a second embodiment of the present invention. The present embodiment is different from the first embodiment in the configuration of a pulley support means which is used to support one side of the pulley 21, which is supported at the other side thereof by the transmission cover 24, and is equal to the first embodiment in configurations of the pulley cover 22 which covers and protects the pulley 21 and the clutch operating mechanism which is disposed at one side of the pulley cover 22 to operate the clutch rod 23 of the motorcycle transmission. Therefore, components identical to those of the first embodiment are designated by the same references and their detailed description will be omitted.

The pulley supporting means of the second embodiment of the present invention includes an extended intermediate shaft portion 41 integrally extending from the intermediate shaft 26 of the motorcycle transmission toward the pulley cover 22 to support the pulley 21 thereon in a rotatable manner, and a bearing 42 installed between the pulley cover 22 and the extended intermediate shaft portion 41. The bearing 42 is inserted between the outer circumference of the extended intermediate shaft portion 41 and the inner circumference of the cylindrical supporting portion 22a of the pulley cover 21 so as to support the extended intermediate shaft portion 41 in a rotatable manner. A fixing plate 43 is coupled to the pulley 21 so as to prevent separation of the pulley 21.

With the pulley cover assembly for the motorcycle transmission according to the second embodiment of the present invention, one side of the pulley 21 is supported by the transmission cover 24, and the other side of the pulley 21 is supported by the supporting portion 22a of the pulley cover 22 via the bearing 42. This permits the pulley 21 to be securely supported at both sides thereof.

Thereby, even if any load is applied to the pulley 21 during motorcycle driving, an shivering phenomenon on the pulley 21 can be minimized to thereby permit an attenuated noise and an enhanced rotational performance of the pulley 21, and eliminates the risk of wear or degradation of elements associated with a specific portion of the pulley 21 rotatably supported on the extended intermediate shaft portion 41 extending from the intermediate shaft 26 of the motorcycle transmission.

As apparent from the above description, the present invention provides a pulley cover assembly for a motorcycle transmission capable of securely supporting both sides of a pulley. Such a pulley cover assembly can minimize an shivering phenomenon possibly caused on the pulley when a driving load of a motorcycle is applied to the pulley, thereby attenuating noise due to the shivering phenomenon, improving a rotational performance of the pulley, and minimizing wear or degradation of elements due to the shivering phenomenon so as to extend the life span of the pulley. Further, according to the present invention, a clutch operating mechanism of the pulley cover assembly can be hydraulically operated, ensuring easy and convenient clutch operation.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pulley cover assembly for a motorcycle gear type transmission comprising:
    a pulley cover to cover and protect a pulley directly connected and rotatably supported on a distal end of an output gear protruding through a transmission cover, the pulley cover having a supporting portion that protrudes toward the pulley;
    a clutch operating mechanism provided at one side of the pulley cover to operate a clutch rod of the motorcycle transmission; and
    a pulley supporting means for supporting the pulley, the pulley supporting means positioned at one side of the pulley opposite to the transmission cover and inserted within the supporting portion of the pulley cover to permit the pulley to be rotatably supported at both sides thereof by both the pulley supporting means and the transmission cover;
    wherein the pulley supporting means includes: a rotatable supporting bracket installed between the pulley and the pulley cover and affixed to a side of the pulley; and a bearing installed in the supporting portion between the rotatable supporting bracket and the pulley cover.

2. The assembly as set forth in claim 1, wherein the clutch operating mechanism includes: a hydraulic casing integrally formed at the pulley cover and having a hydraulic oil inlet passage and a hydraulic oil outlet passage; and a piston disposed inside the hydraulic casing while being fixed to an end of the clutch rod of the motorcycle transmission, whereby the clutch operating mechanism supplies hydraulic power into the hydraulic casing to permit the piston to linearly move the clutch rod by a predetermined distance.

* * * * *